US005611027A

United States Patent [19]

Edgar

[11] Patent Number: 5,611,027

[45] Date of Patent: Mar. 11, 1997

[54] IMAGE ENHANCEMENT WITH MASK HAVING FUZZY EDGES

[75] Inventor: Albert D. Edgar, Austin, Tex.

[73] Assignee: International Business Machines Corporation, Armonk, N.Y.

[21] Appl. No.: 185,636

[22] Filed: Jan. 24, 1994

Related U.S. Application Data

[63] Continuation of Ser. No. 925,340, Aug. 4, 1992, Pat. No. 5,319,742.

[51] Int. Cl.[6] ..................................................... G06T 11/00

[52] U.S. Cl. ........................... 395/131; 395/133; 395/135

[58] Field of Search ............................ 395/131, 125–130, 395/133, 134, 135, 141, 155, 161

[56] References Cited

U.S. PATENT DOCUMENTS 5,319,742 7/1994 Edgar ...................................... 395/127

*Primary Examiner*—Almis R. Jankus

*Attorney, Agent, or Firm*—Jeffrey S. LaBaw

[57] ABSTRACT

A mask having at least two areas is defined over an image. The mask pixels are mapped with an error diffusion or dithering process to mix the mask pixels between the areas. Image pixels which correspond in position to the mask pixels are mapped to color palettes selected for the at least two areas. An image effect is applied to the color palette of one of the areas called the unmasked area. The same image effect is not applied to the masked area. The error diffusion or dithering has provided a fuzzy edge to the mask and these processes are quick to accomplish with a minimum number of states. Since the image effect is applied to only a relatively small number of palette colors, user feedback is nearly instantaneous.

10 Claims, 11 Drawing Sheets

IMAGE ENHANCEMENT WITH MASK HAVING FUZZY EDGES

This is a continuation of application Ser. No. 07/925,340 filed on Aug. 4, 1992, now U.S. Pat. No. 5,319,742.

BACKGROUND OF THE INVENTION

This invention relates generally to image processing. More particularly, it relates to an improved method for performing image enhancement processing on a portion of an image without leaving a cut-out appearance on the enhanced image.

In image processing, frequently an image will be too dark, too red, too green or have some other defect which will require an image processing operation to be uniformly applied over the entire image. Also frequently, however, only one portion of the image will require a particular image processing effect. For example, a user, or shall we say an artist, might want to increase the red in the center of a portrait to enhance the skin tones, but leave the edges or background untouched. To alter only one portion of an image with an effect, it is known to define a mask area to block a portion of the image from by the chosen image processing operation.

Heretofore, the known imaging applications and devices have shared one or both of the following defects for masked imaging operations: A significant delay between the time the user has input the type and extent of the desired imaging effect and/or a sharp line separating the masked and unmasked areas of the image.

First, color enhancement in image processing is inherently a "right brained", creative activity. That is, the decision that more red is required in a specific area of an image is an aesthetic and artistic decision. Yet image processing with a data processing system relies on numeric quantization of the effect, forcing the artist into a left-brained approach to achieve the desired changes. Image systems ask the artist to express desires as "fifty percent magenta" or "ten percent more contrast". Changing an image according to numerical calculations is hardly intuitive to a user and makes it difficult to optimize the image. This is particularly true if the user is inexperienced. Compounding this problem, is that many image processing systems require a long delay while the processor calculates how to display the result of the image processing effect on the image.

An expert able to work effectively with the delayed system has through experience constructed a mental model which gives instantaneous mental feedback. Such an expert can visualize what more magenta will do to a picture before going into a darkroom. However, such a model requires training and limits the number of variables the artist can handle. Even then, multiple iterations are often required for accuracy. For a non-expert who has not developed this mental model, useful image processing color enhancement can only be done with instantaneous feedback. Instantaneous feedback makes everyone an instant expert and adds excitement and immediacy to the process.

Second, many image processing systems which use a masking effect leave a sharp line between the area where the image processing effect was carried out and that area which was masked. This is unacceptable as most edges in an image are surprisingly diffused under magnification. To avoid a cut-out appearance around the changed area, the mask must have a fuzzy or diffused edge.

To make an image enhancement program for the widest possible market, it must combine a fuzzy mask with instantaneous feedback for the imaging effect. The prior art could give only one or the other. This invention improves an image processing operation carried out on a masked image by both providing instantaneous feedback to the user and eliminating the cut-out appearance of the enhanced image.

SUMMARY OF THE INVENTION

It is therefore an object of the invention to provide nearly instantaneous feedback to the user after an effect is applied under control of a mask.

It is a concurrent object of the invention to avoid a cut-out appearance between the area which received the image processing operation and the area which was protected by the mask.

These and other objects and features of the invention are accomplished by defining a mask having at least two areas, mapping the mask pixels with an error diffusion or dithering process and color mapping image pixels which correspond in position to the mask pixels to color palettes, selected for the two areas.

In effect the image is divided up into two or preferably three different areas. First, the three different mask areas are defined on the image: the "masked" area where the selected image effect will not take place, the "unmasked" area where the selected image process will take place, and a transition area between the masked and unmasked areas where a partial version of the image process will take place. Three different color palettes each of which correspond to one of the mask areas, are chosen during color mapping. After the general boundaries of three areas are defined, an error diffusion or dithering algorithm based on the three states between the mask is performed to reassign mask pixels of the three areas so that a fuzzy or diffuse effect is achieved between the masked and unmasked areas. The color image is mapped to the appropriate palette depending on the assignment of the image pixel.

The selected image processing operation will be performed on the palette corresponding to the unmasked area, no image operation be will performed on the palette corresponding to the masked area, and a partial effect is performed on the transition region palette.

In one preferred embodiment, as there are 256 palette colors available in the display table in many computer systems, 85 colors are allocated to the palettes of the masked, unmasked and transition areas. Initially, the 85 colors in each palette may be the same. Once the selected image operation is performed on the palettes of the unmasked and transition areas, the colors in the palettes of the three areas will be different. These palettes will be loaded into the color display table of the display adapter of the computer system for presentation.

BRIEF DESCRIPTION OF THE DRAWINGS

These objects and features will be more easily understood by reference to the attached figures.

DETAILED DESCRIPTION OF THE DRAWINGS

Figure 1:
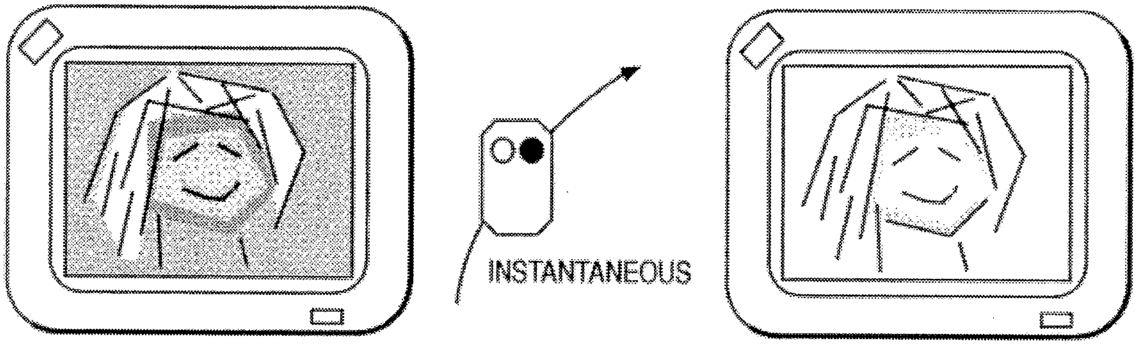
FIG. 1 depicts an image in which a image processing operation has been applied over the entire image.

FIG. 1 represents an image processing system in which an image processing effect is performed across all pixels. The image is displayed by first selecting a small number of representative colors, for example, 100 colors. Such a set of colors is called a palette. The palette, as well as possibly other palettes for other images, is loaded into a piece of hardware called a color lookup table (CLUT). Next, the image is mapped so that each pixel in the image is assigned a number pointing to one of the colors in the palette. During display, the hardware "refreshes" the image, typically 60 times a second, by retrieving for each pixel the mapped number, sending to the CLUT this number and receiving the exact color to display for that pixel from the CLUT. It is fairly easy to achieve near instantaneous feedback to the user when all pixels are subject to a particular image effect by modifying the relatively small number of colors in the single palette and the associated CLUT. As illustrated, the right (processed) image is considerably brighter than the left initial image to illustrate a user controlling image brightness. When the computer senses a command to lighten the image, it adds a constant to all 100 colors in the palette and loads the revised palette in the CLUT. As the image is refreshed from memory 60 times a second by the display adapter with the new values for each of the colors in the palette, all 300,000 pixels on the screen change virtually instantaneously.

While some corrections can be done by changing the entire image, frequently, an effect must be limited to certain areas, perhaps the background needs darkening, or the eyes need to be a bit brighter. In such case, an artist constructs a "mask" that covers the image, protecting some image areas, the "masked" areas, while other areas are left exposed to the effect, the "unmasked" areas. In the invention, the "masked", "transition" and "unmasked" areas make up the mask each of which is at a different mask state. For advanced effects, there may be more than one transistion area.

Figure 2:
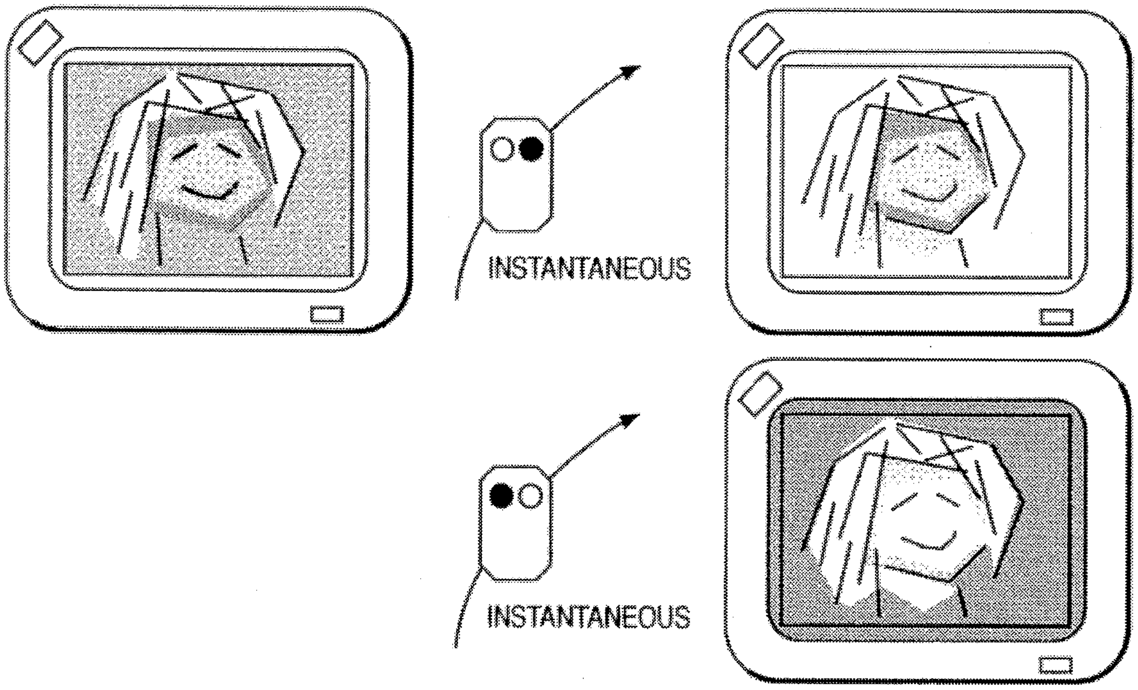
FIG. 2 depicts a mask operation in which a image operation is performed over part of the image.

FIG. 2 is an illustration of the present invention showing a "masked" area protected from an imaging effect and an "unmasked" area subject to the image processing effect where a fuzzy transition area separates the masked and unmasked areas. As above, the image to the left is the initial image. The top right image illustrates a case where the face of the portrait corresponds to the masked area and the border has been brightened. The bottom right image illustrates the case where the background corresponds to the masked area and the face of the portrait has been brightened.

The mask has a fuzzy transition area so a cut-out effect is avoided. Most edges in images are surprisingly soft under magnification. Defining a sharp boundary, even for edges that appear sharp, results in an image that appears to be cut out with scissors and pasted to the background. Further, even for a perfectly sharp boundary, a sharp mask will be displayed with staircased sides. The applicant has found that it is actually much better for the mask edge to be less sharp than the edge in the image being traced. The eye is much more forgiving of the high frequency edge detail being slightly muted than for unnatural edge detail being added. Even when the mask is slightly blurred with respect to the image boundary, the effect appears natural and the eye is unable to detect the presence of a mask. A sharp mask, on the other hand, almost always looks fake. In the present invention, the mask sharpness may vary as an edge falls in and out of focus, and, in the case of a face, may have a definable edge on the top, but a region of transition across the neck.

Figure 3:
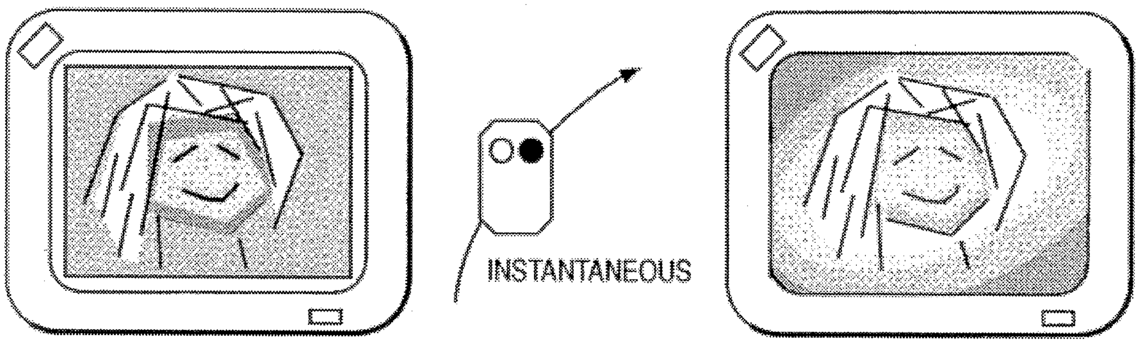
FIG. 3 is a representation of the present invention where an effect is applied over part of an image using a highly diffuse mask giving instantaneous feedback and avoiding the cut-out appearance of the prior art.

Often there may be no definable edge at all to the mask and the artist wants to feather an area between the masked area and the area subject to the image processing effect. Such a case is illustrated in FIG. 3 in which the background is vignetted for a spotlight effect around the portrait. In this case, the transition region covers a large part of the image, not necessarily following any boundary. To enable right brained artistic behavior and enable instant expertise, the invention displays the change in the image more or less instantly to let the artist experiment with magnitude. If an instantaneous effect were available, prior art programs let the user define only a sharp mask.

Figure 4:
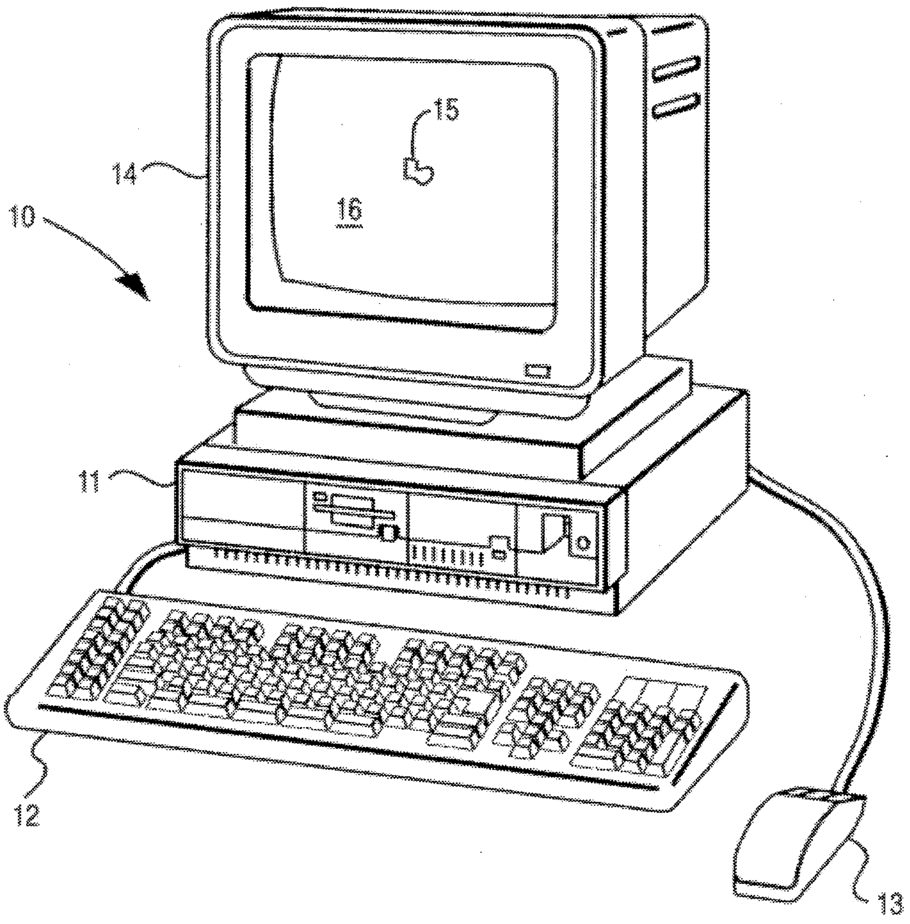
FIG. 4 is a representation of a computer system in which image processing is performed including a system unit, a keyboard, a mouse and a display.

In FIG. 4, a personal computer 10, preferably one in the IBM Ultimedia PS/2 series of computers, for example, the IBM PS/2 Ultimedia Model M57 SLC comprising a system unit 11, a keyboard 12, a mouse 13 and a display 14 is depicted. The screen 16 of display device 14 is used to present the image during an image processing session.

Figure 5:
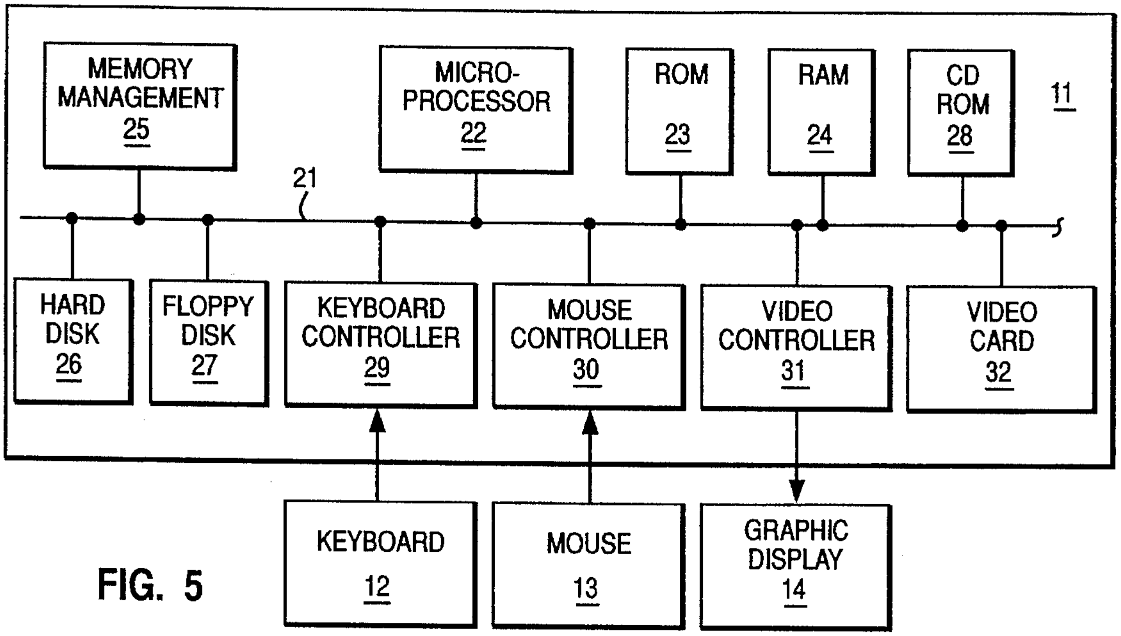
FIG. 5 is a block diagram of the computer system components of computer system shown in FIG. 1.

FIG. 5 shows a block diagram of the components of the computer shown in FIG. 4. The system unit 11 includes a system bus to which various components are coupled and by which communication between the various components is accomplished. A microprocessor 22 is connected to the system bus 21 and is supported by read only memory (ROM) 23 and random access memory (RAM) 24 also connected to system bus 21. A microprocessor is one of the Intel family of microprocessors including the 8088, 286, 386 or 486 or 586 microprocessors. The microprocessor in the IBM Ultimedia Model M57 SLC is the 386SLC processor which is a high performance cached version of the standard 386. However, other microprocessors including, but not limited to Motorola's family of microprocessors such as the 68000, 68020 or the 68030 microprocessors and various Reduced Instruction Set Computer (RISC) microprocessors manufactured by IBM, Hewlett Packard, Sun, Motorola and others may be used in the specific computer.

The ROM 23 contains among other code the Basic Input/Output System (BIOS) which controls basic hardware operations such as the interactions of the disk drives and the keyboard. The RAM 24 is the main memory into which the operating system and multimedia application programs are loaded. The memory management chip 25 is connected to the system bus 21 and controls direct memory access operations including, passing data between the RAM 24 and a hard disk drive 21 and floppy disk drive 27. A CD ROM 28, also coupled to the system bus 21, is used to store the large amount of data present in a multimedia program or presentation.

Also connected to this system bus 21 are three I/O controllers: the keyboard controller 29, the mouse controller 30 and the video controller 31. As might be expected, the keyboard controller provides the hardware interface for the keyboard 12, the mouse controller 30 provides the hardware interface for mouse 13 and the video controller 31 is the hardware interface for the display 14. Lastly, a video card 32 such as the DVI™ digital capture/display card may also be coupled to the system bus to provide image capture and display functions.

Figure 6:
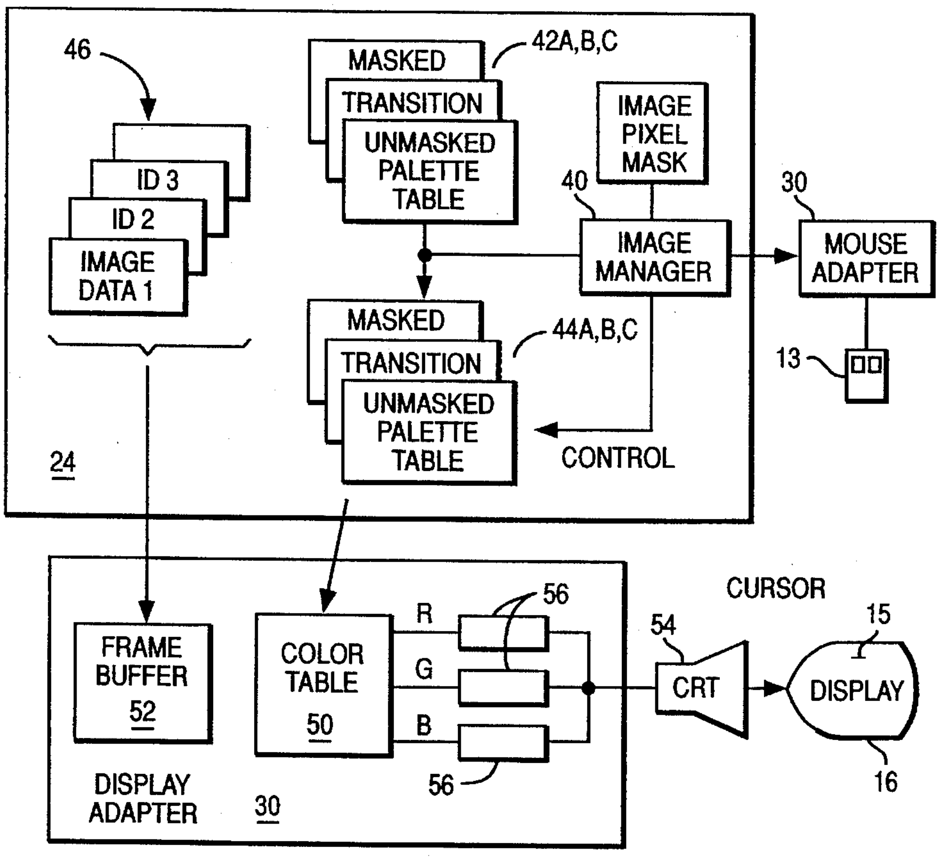
FIG. 6 depicts the invention as implemented in the personal computer system.

In FIG. 6, the personal computer includes RAM 24 in which image manager 40, initial color palette tables 42, processed color palette tables 44 and image data 46 are stored. Image manager 40 includes color mapping code to build the initial color palette tables 42 from image data 46. The image manager 40 also contains user interface code to define the general boundaries of the three areas of the image, error diffusion code to map the image pixel by pixel to the three areas, and image processing code to process the initial color palette tables 42 to the processed color palette tables 44 according to the desired image processing effect. Once the processed color palettes are built, the image manager 40 will transfer those palettes to the color lookup table (CLUT) 50 in the video control display adapter 30 for presentation by the display 14.

The personal computer processor 22 (FIG. 5) under control of the image manager 40 also builds data for a frame buffer 52 within the video controller 30. The frame buffer 52 contains the digital representation of the image to be displayed on the graphic display 14. Each pixel in the frame buffer 52 carries an index to a color in the CLUT 50. When a pixel is to be displayed, its red, green and blue intensities are passed to the red, blue, green drivers 56 that drive the three color guns in the graphic display 14.

Typically, the palette colors are chosen to be colors similar to those in the image. Most palettes contain no more than 256 colors so that each color can be assigned a number within an 8-bit data string. The image is then mapped to the palette by assigning each pixel in the image a number which points to the closest color in the palette. Error diffusion and other methods dither the assigned colors so that from a distance the displayed image has the appearance of continued shading, despite being composed of only relatively few colors.

The graphic display has three color guns, red, green and blue, to generate the color from the screen and each storage location in the color tables 42, 44, and 50 contains 24 bits, an 8-byte bit for each of the primary colors, red, green and blue. Therefore, each primary color has $2^8$ or 256 variations in shade from no intensity at 0 to brightest red, green or blue at 255. Since there are $2^8$ intensities for each primary color and there are three primary colors, the possible color combinations are $2^{24}$. However only 256 of these possible color choices are typically loaded in the display color table 50 by the image manager program 40.

Figure 7:
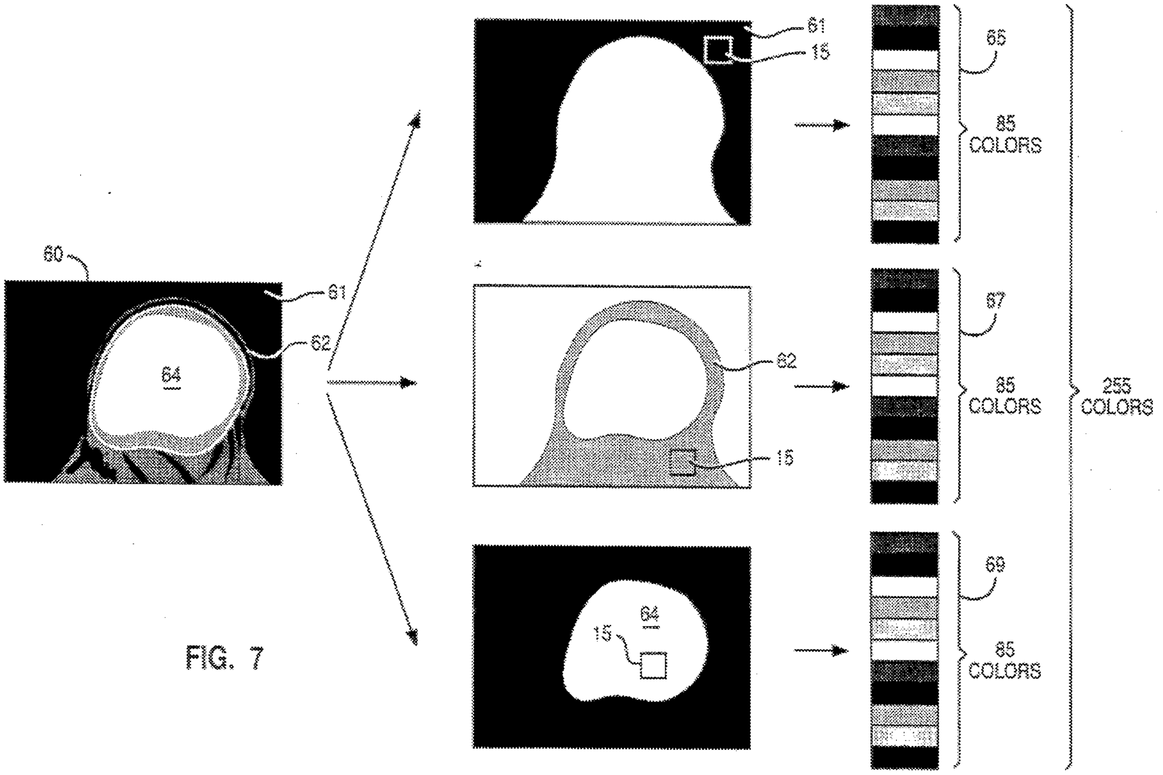
FIG. 7 is an illustration of a mask registered to an image, the mask having a masked area, a transition area and an unmasked area.

FIG. 7 depicts a mask 60 associated with an image of a portrait. The mask is divided into three areas, unmasked area 61, transition area 62, and masked area 64. Since most typical palletized display adapters allow only 8 bits to be stored for each image pixel, only 256 colors can be loaded in the color lookup table. The invention divides these colors between separate palettes for each of the regions under the mask, three in this example. If the palettes are evenly divided, there can be 85 colors in the palette for each area. In this embodiment, the color palette for the unmasked area 65, that for the intermediate area 67, and the masked area 69 each have 85 colors.

Figure 10:
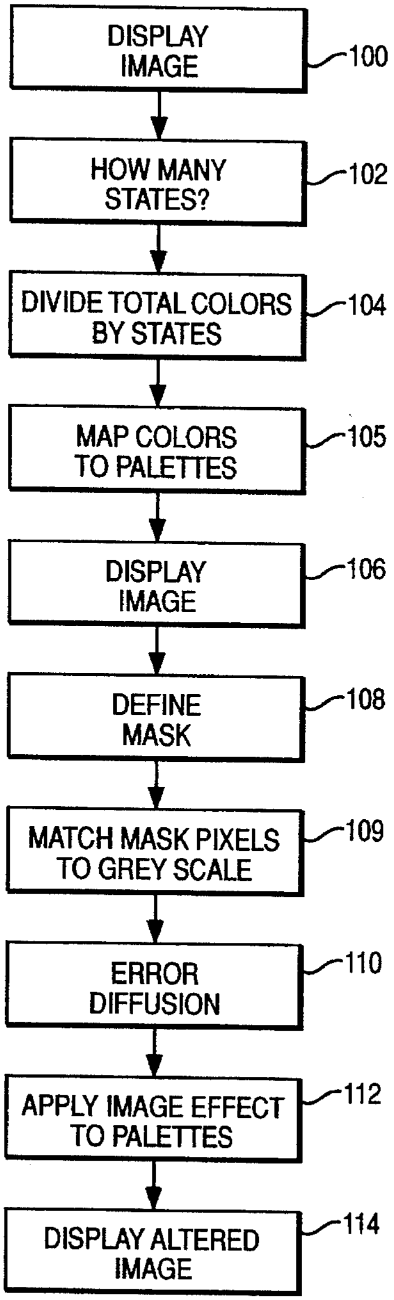
FIG. 10 is a flow chart of the first embodiment of the invention.

After the initial display of the image, step 100 in FIG. 10 where the artist has yet to decide that a masked image effect is desired, the system needs to know how many states the fuzzy mask will have in step 102 (FIG. 10). While the examples which follow illustrate a 3 state mask, other numbers of mask states are possible. The number of mask states influences the graininess of the image map and the graininess of the mask map in the transition region. An image with many colors in which the anticipated effect under the mask will be small could possibly use just two mask states. If the effect under the mask is extreme and the transition region large, 4 or even more mask states may be appropriate. The 3 mask states illustrated in the specification are adequate for a large number of images. The number of color tables 42 allocated for the palettes is equal to the number of states.

Next, the total number of available palette colors are divided by the number of masking states, step 104. Assuming a 256 color palette and 3 mask states, there will be 85 colors available per state. The three display palettes are defined by replicating the 85 color palette 3 times giving 255 total colors. The display image is created by first mapping the entire image to 85 colors, step 105. There are many well known algorithms to perform the color mapping; a particularly preferred technique is described below. The image pixels in the mapped image are given a number corresponding to the color palette, adding an offset of 85N, where N is the integer level of the corresponding pixel in the mapped mask, N being 0, 1 or 2 in our example. The palettes are loaded into color palette tables 42A, 42B and 42C in FIG. 8, and the image displayed using the 85 color palette, step 106.

Figure 14:
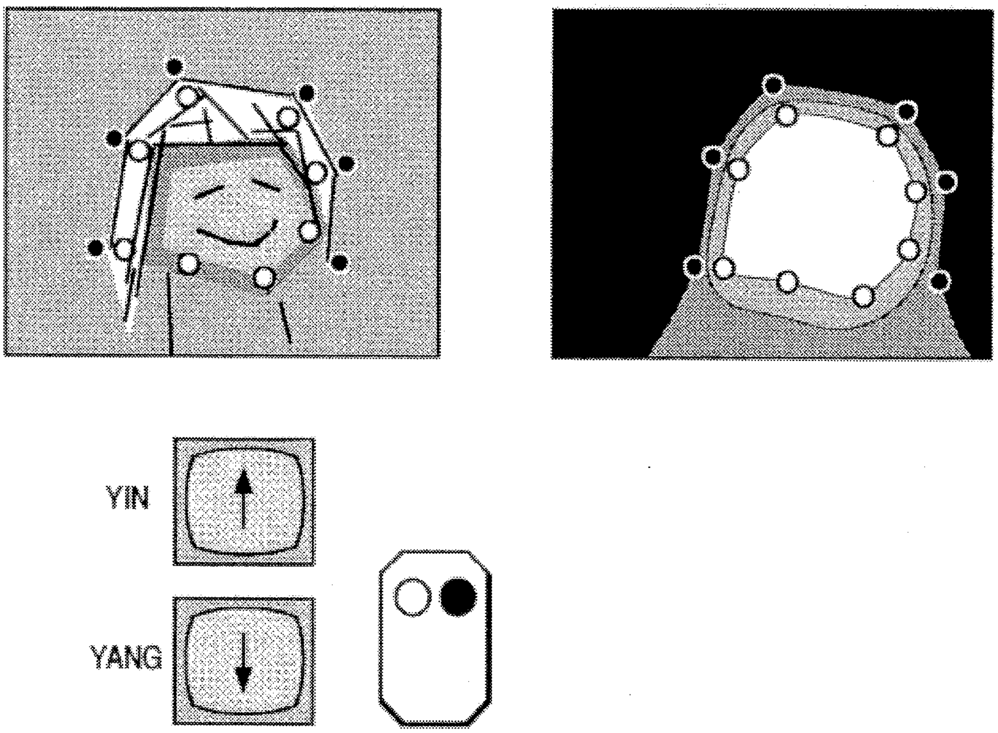
FIG. 14 is an illustration of a user interface for the masking operation.
Figure 15:
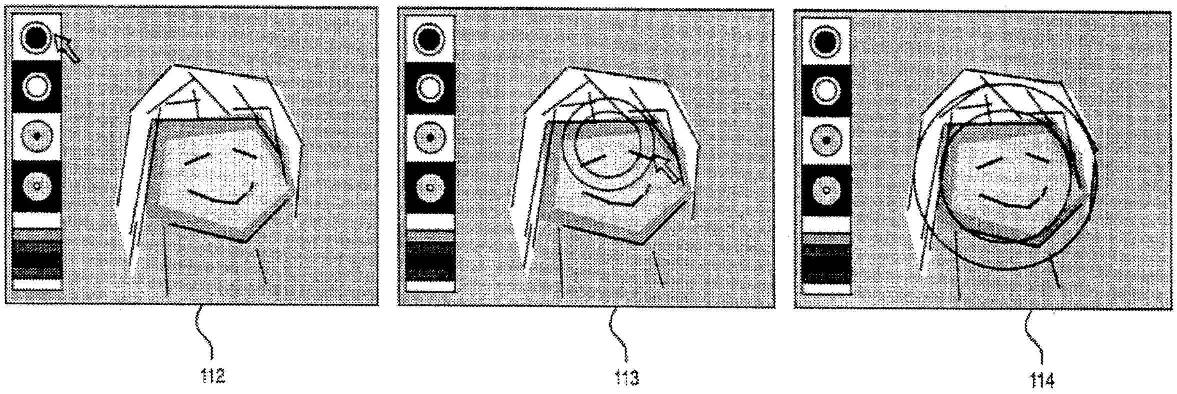
FIG. 15 is an illustration of a user interface in which predetermined masks are available for user selection.

Generating the mask is now explained. FIGS. 14 and 15 below illustrate sample user interfaces to define a mask. A predefined mask can be selected from iconic means in a user interface. The predefined masks could include several masks analogous to the common masks used in modern day photography such as a center mask or vignetter, or a graduated effect common in special effect photographic filters. Or the user may define the mask in a customized manner for each image.

After the general dimensions of the mask are defined in step 108, there is a masked area, an unmasked area exposed to the image processing effects and a transition region generally much smaller in extent than the masked area or the unmasked area and partially exposed to the imaging effect. Each pixel in the transition area would contain a number expressing the magnitude of the mask effect for that pixel. The mask has the form of a monochrome image. In one preferred embodiment, each pixel of the mask has an 8-bit value varying from 0=unmasked area and 255=masked area. A continuum of values between 1 and 254 define the transition region, step 109. The mapped mask information is stored in the mask definition table 43 (FIG. 8) For purposes of display of the instantaneous display of the fuzzy mask, the value for all pixels is mapped to a small number of states, 0% or 0, 50% or 128, or 100% or 255 in the example. It is only during the much slower, but much more accurate, development process described that the full range of values in the transition area are used.

Figure 8:
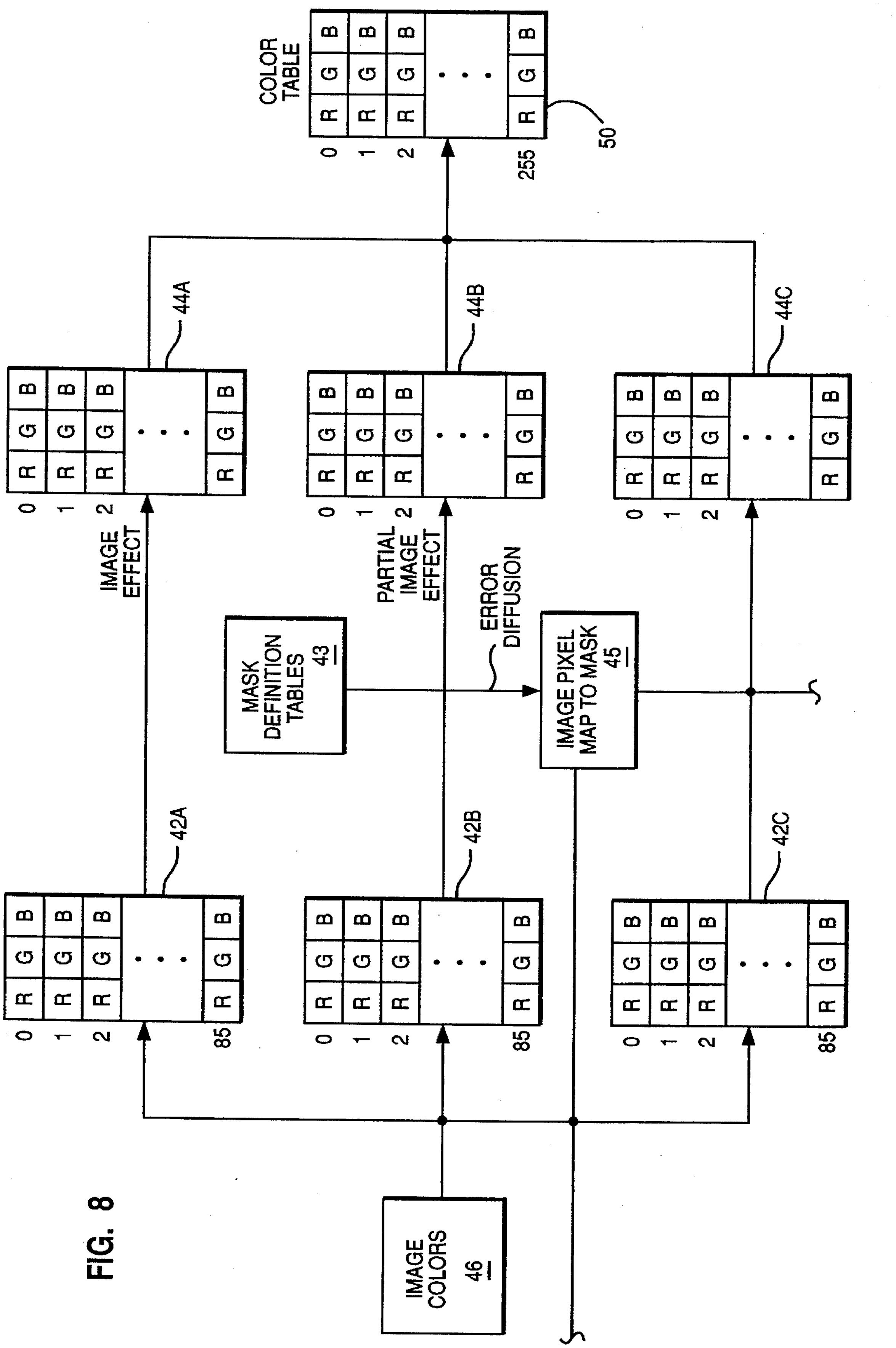
FIG. 8 is a block diagram of a first embodiment the imaging in process of the present invention.
Figure 9:
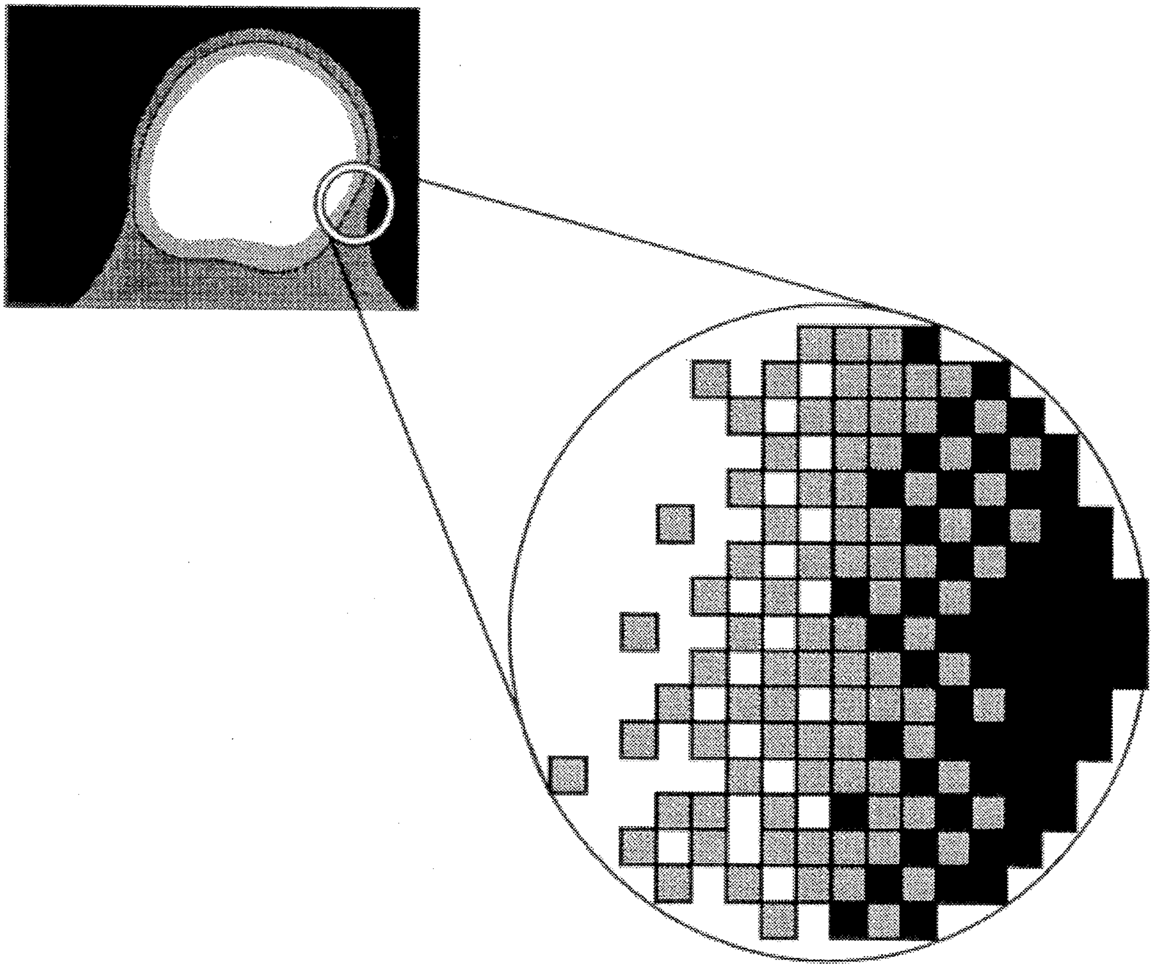
FIG. 9 is an illustration of the error diffusion of the three mask areas showing that the mask pixels have been switched between mask areas.

The monochrome mask image is now mapped to the number of states which in this example is three, step 110. The mapping preferably uses a good error diffusion technique to switch the mask pixels between mask areas. Dithering is an alternate mapping technique which could be used in the invention, but is less preferred. Since color is not involved, mapping the mask can be performed much quickly than mapping an image in which color selections would be required. As above, the resulting pixels which are allocated to the masked area are illustrated in white, those allocated to the transition area in gray, and those allocated to the unmasked area unhatched in FIG. 9. The diffusion allows the effect of the mask over an area to appear to vary continuously with position, even though only three states are available to the mask. The gray scale mask information is stored in the mask definition tables 43 (FIG. 8).

Conventional wisdom would suggest that any image such as a mask mapped to only 2 or 3 states is too grainy. This would be true if the mask were displayed on an image defining a transition from white to black, but in practice, the difference in color caused by the mask is not white to black, but is totally dependent on the magnitude of the image processing effect, and is typically not over 10%. A 10% brightness change across a 3 state masked is equivalent to 20 steps between pure white and pure black. It can be compared to a $20^3$, or 8000 state color palette as a color palette must cover three dimensions. While the 3 state mask is not quite as good as an 8000 color palette covering the full image, it is at least a match for the 85 color palette when the image effect is moderate.

When the image is displayed in step 106, the original image appears on the screen. Even though the image is composed of three palettes, each of the palettes is initially identical, so the image appears exactly like the underlying 85 color mapped image, and there is no visible clue that there is a mask over the image. By applying the image processing effect to the palette colors in the unmasked area and half of the effect to the palette colors belonging to the transition region in step 112, the image is altered and displayed next time the screen is refreshed step 114. As the effect is applied only to 170 (85+85) palette colors, the calculation is performed 2,000 times faster than if the effect were applied to each of the 300,000 color pixels in a typical full image. This speed enables the image to be adjusted by "feel", rather than relying on a delayed numerical approach as described above.

While there exist many image processing techniques which might be applied to the unmasked and transition areas, a particularly preferred image process is described in Ser. No. 07/925,710, now U.S. Pat. No. 5,319,742 "Method and Apparatus For Grayscale Adjustment" filed Aug. 4, 1992 by A. D. Edgar and is hereby incorporated by reference. A preferred method for handling the RGB color components of an image for display on a computer is described in Ser. No. 07,925,712, now U.S. Pat. No. 5,319,742 "Method & Apparatus for Linear Color Processing" Filed Aug. 4, 1992 by A. D. Edgar and is hereby incorporated by reference.

After the magnitude of the effect has been evaluated and the optimum parameters are established by the artist, the effect is applied to each of the image pixels under the control of the full gray scale mask in a much slower procedure called development. In development, each image pixel of the original unmapped image is retrieved from memory. The color of this pixel is processed by the same image processing effect that was applied to each of the palette colors. The magnitude of this effect is multiplied by the unmapped mask pixel value for the effect which varies between 0 and 100%. Recall that in the display process described above, only 0%, 50% and 100% values for the image effect were used. Finally, the new image pixel values are combined and stored in memory as the developed image. Because the developed image uses the unmapped image and mask, it is free of the graininess which might be caused by the mapping. Development is much slower, however, than the simulation of the effect by changing only the palette according to the present invention.

One feature of the first embodiment of the invention is that a new mask may be defined by reusing the original mapped image with the new mask, providing the image was not developed. If the image was developed, the image must be remapped when a new mask is applied.

Figure 13:
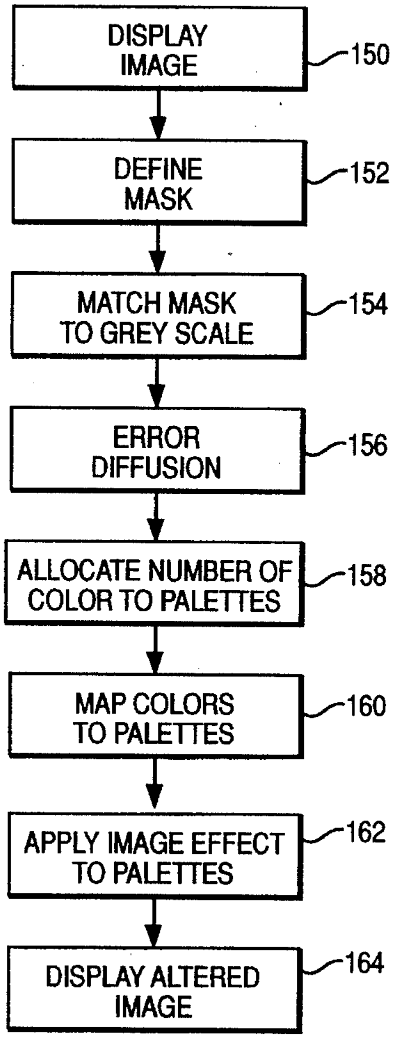
FIG. 13 is a flow chart of the second embodiment of the invention.
Figure 11:
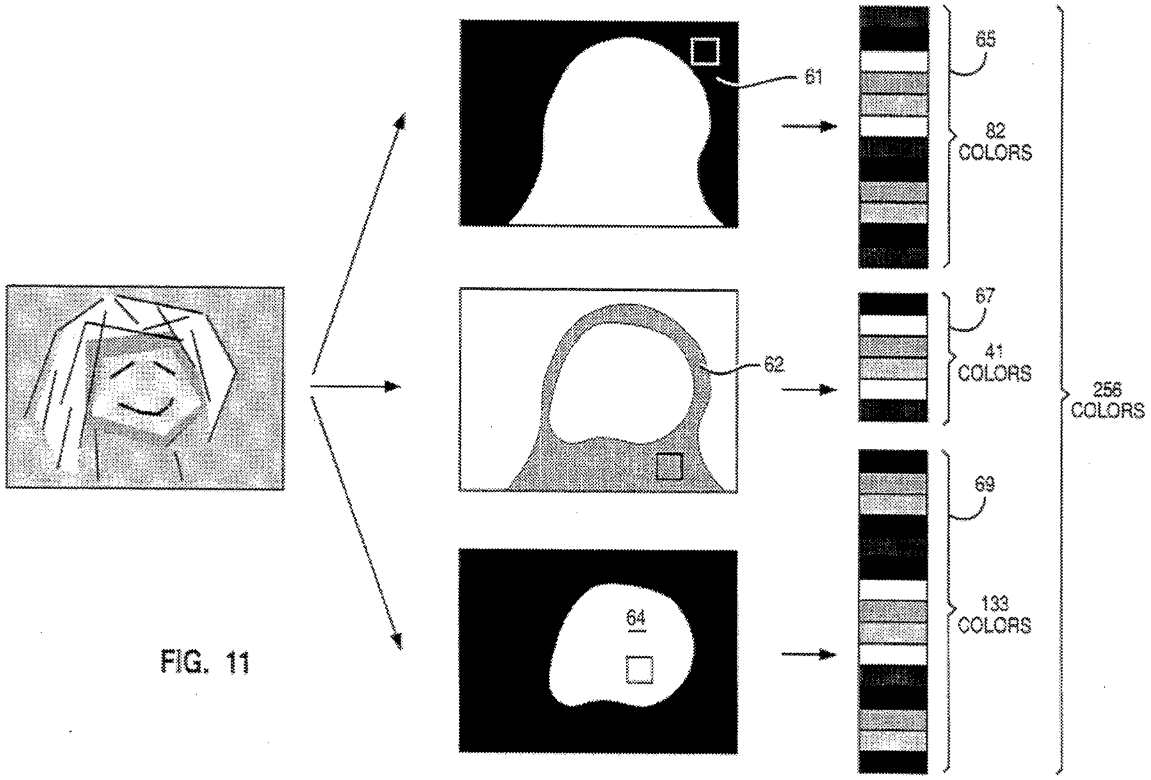
FIG. 11 shows a second embodiment of the invention illustrating a mask having a masked area, an transition area and an unmasked area.
Figure 12:
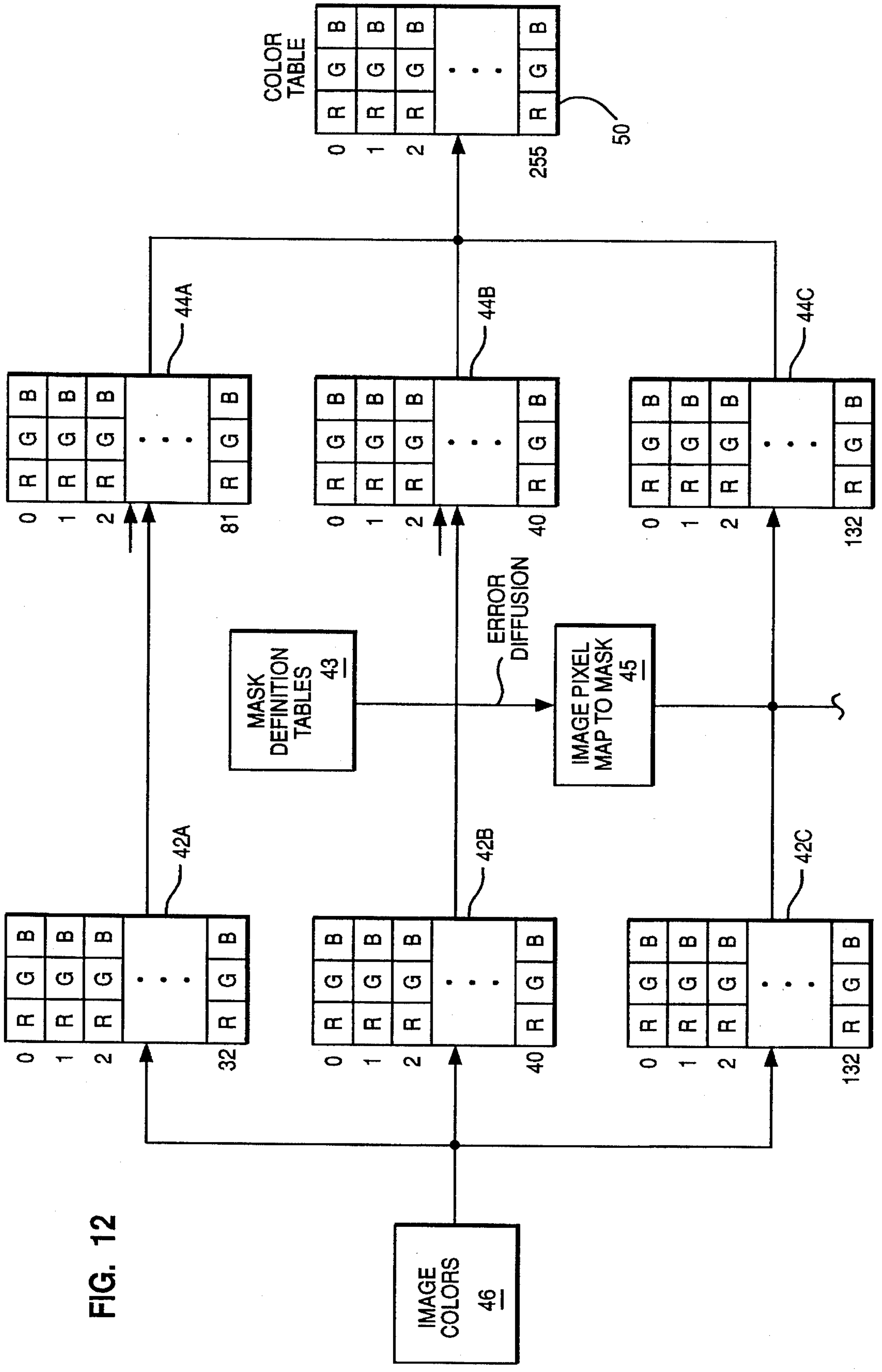
FIG. 12 is a block diagram of the image in the second embodiment of the invention.

A second embodiment of the present invention which provides better image quality during palette adjustment at the expense of a slower setup time for a new mask is disclosed with reference to FIGS. 11, 12 and 13. The nearly instantaneous display of the effect of a given image processing operation, however, does not change.

To practice the second method, as before, after the image is displayed, step 150, the image is divided into three areas, step 152. The masked area 61, the unmasked area 64 and the transition area 62 are matched to the grey scale image, step 152. Next, the pixels in the mask are mapped using the error diffusion technique as above, step 156.

The second embodiment allocates the size of the palettes belonging to the three areas, step 154. Each region typically has a different mix of colors in the image and varies in importance due to size. There is no constraint that the regions use the same colors or the same number of colors; a better palette match is possible than with the first method in which the same palette was used for all three regions. In the second embodiment, the palettes for the three areas are chosen after the monochrome mask pixels have been mapped, step 160. The palette for the masked area is selected for all image pixels which correspond to a "masked" mask pixel in the mapped mask, for example, the black pixels in FIG. 9. Thus, some of the pixels used for selecting the palette for the masked area are in the transition area. The palette for the unmasked area is selected for the image pixels which correspond to an "unmasked" mask pixel in the mapped mask, the white pixels in FIG. 9. The palette for the transition area is selected for the image pixels which correspond to transition pixels in the mapped mask, the gray pixels in FIG. 9. This is so that the color palettes have the necessary colors to map the pixels.

The color mapping for the new palettes is accomplished using the same color mapping routine as used in the first method, however, as there are three different palettes from which to select, an image pixel corresponding to an unmasked mask pixel in the mapped mask must have a color chosen from the unmasked color palette; if an image pixel corresponds to a transition mask pixel in the mapped mask, the color must be selected from the transition palette; and, if the image pixel corresponds to a masked mask pixel in the mapped mask, the color must be selected from the masked palette.

Next, as in the first embodiment, the image effect is applied to the unmasked palette and a partial image effect is applied to the transition palette, step 162. The altered image is displayed on the next screen refresh, step 164.

In the second method, the image cannot be mapped three times with the three palettes and a pixel chosen afterwards by the mask mapped pixels from those three images as in the first example, because in this case, that would disable the effect of the error diffusion by switching across three uncorrelated images, thereby causing excess grain. The mapping must be integrated into a single pass with palette selection controlled on a per pixel basis by the mapped mask image for diffusion to work, and the image must be remapped each time the mask is changed.

Error Diffusion

While there exist many acceptable methods in the prior art for the error diffusion operation map mask pixels to the three areas, a preferred embodiment uses that method described in patent application Ser. No. 07/706,466, "Positive Feedback Error Diffusion Signal Processing", Filed, May 28, 1991, to A. D. Edgar which is hereby incorporated by reference. To match the quantitized image and the frequency characteristics of the human eye, the invention teaches the selective use of positive feedback as applied to the quantization error.

Error diffusion is a method for minimizing conversion quantization error over multiple samples by eliminating the net average error. In conventional error diffusion, the value of the quantization error is conveyed to the next successive temporal or spatial quantization measurement as a negative feedback value. According to the '466 application, the quantization error attributed to the pixel at location (X, Y) on the video image is added as a positive feedback value during the quantization of data for the pixel at location (X+1, Y+1). The positive error feedback value so introduced is offset by the addition of complimentary error data during the quantization of the pixels at locations (X, Y+1) and (X+1, Y). The method reduces the noise level at the lower frequencies in the spatial spectrum where human visual acuity tends to be greatest.

Palette Selection

While there exist many methods for selecting a palette of colors customized for a selected image, the preferred mode for the present invention is an improvement of the procedure disclosed in *IBM Technical Disclosure Bulletin*, Vol. 29, No. 3, August 1986, pp. 1329–34, entitled "Procedure for optimum Choice of A Small Number of Colors From A Large Color Palette for Color Imaging" by G. W. Braudaway, which is hereby incorporated by reference. The Braudaway algorithm uses two three-dimensional arrays with red, green and blue dimensions. The first "population" array holds a three-dimensional bar graph of the number of occurrences in the image of each color, the second "representational" array holds a measure of how well represented each color is by the colors already chosen for the palette. The colors are chosen in the order in which the ratio of population to representation is highest. After each choice, the representation array is modified and the process is repeated until the palette is filled. After the selection of a color, the Braudaway algorithm multiples each element in the representation array by the square of the Cartesian distance between that element's associated color and the newly selected color.

The improved method changes the recalculation of representation array by calculating the distance between the element's associated color and the newly selected color emphasizing luminance over chrominance after the distance is calculated. In addition, rather than squaring the distance, the distance in each element is multiplied by the fourth power of the distance. The representation array element is chosen to be the smaller of the original value or the original value multiplied by the fourth power of the distance.

The fourth power is used as the color formation and real world images are predominantly grouped in planar distributions within a color cube. Assuming that there are two planar regions in color space, the first with one color from the image per unit area and the second equal size region with n colors of the image per unit color area, one unit of palette colors is available to satisfy both regions. X units of these colors will be allocated to region 1, leaving 1−X units for region 2. With X colors to map the two-dimensional area of region 1, the X palette colors are laid as a square root of X by square root of X grid and the separation between the palette colors is proportional to 1 over the square root of X. The error or average distance from an arbitrary color to the closest color is also proportional to 1 over the square root of X. Similarly, for region 2, the error is proportional to 1 over the square root of (1−X). To minimize visual noise, the colors are distributed between the regions to minimize the mean squared error. The average error for each region is squared, multiplied by the number of colors in the region. The allocation variable, X, is chosen to minimize some of the errors in the two regions. The visual noise is minimized when the ratio of the colors allocated between the areas is the square root of the ratio of the actual image colors contained in each region.

The eye is more sensitive to luminance rather than color. Rather than calculating the distance in Cartesian space by the equation:

$$D^2=(dR)^2+(dG)^2+(dB)^2,$$

the following set of equations are used:

$$D^2=K_Y(dY)^2+K_D(dY)^2+K_Q(dQ)^2 \quad \text{Where}$$

$$Y=K_1(dR)^2+K_2(dG)^2+K_3(dB)^2= \quad \text{luminance, or black \& white component}$$

$$R=K_4(dR)^2+K_5(dG)^2+K_6(dB)^2= \quad \text{orange-blue color component}$$

$$Q=K_7(dR)^2+K_8(dG)^2+K_9(dB)^2= \quad \text{green-magenta color component, and}$$

(dR)=difference in red component of the two colors whose distance is being found.

The coefficients are modified from standard definitions to enhance red and give equal color vector lengths:

$$D^2=2.10\ (dR)^2+2.70\ (dG)^2+0.54\ (dB)^2+3.30\ (dR)(dG)+0.89\ (dR)(dB)+1.61\ (dG)(dB)$$

These formulas emphasize fine steps in luminance, to which the eye is most sensitive over color, to which the eye is less sensitive. The large area sensitivity of the eye to color is served by the error diffusion used as the image pixels are assigned palette colors. It is interesting that to the extent colors are randomly chosen in a region of volume, the above directional emphasis will have no statistical effect just as a cube of error expanded horizontally is undistinguishable on a model scale from one expanded vertically, however, the treatment of non-random formations in color space will be affected by the above formulas.

User Interface

FIG. 14 is an illustration of one preferred embodiment of a user interface to define a customized mask. In the portrait, a series of "yin and yang" points are defined by using the mouse as a pick. In this case, the yin points are illustrated as white circles and denote an outside of the masked area and the yang points are illustrated as black circles which provide the inside of the unmasked area. Between the yin and yang points are one or more transition areas. The mouse can pick a yin point up by bringing the mouse cursor to the yin button, pressing and holding a mouse button to drag the yin point to a particular pixel in the drawing, then releasing the mouse button to relocate the point. A similar operation is performed for the yang points once the points are defined, the computer can interpolate the remainder of the mask using these points as reference. It is assumed at this point that the user has already selected the number of states in the mask.

FIG. 15 illustrates another user interface which might be used with the present invention in which a plurality of predefined masks are available to the user. Represented as icons in the left column of the user interface. The user will click on a particular icon, a predefined mask will then appear at a predefined size and location on the screen. A circular mask is displayed over the image in the center illustration representing the boundaries of the masked, transisition and unmasked areas. If the mask is not sized or located correctly, the borders in the mask can be grabbed as a conventional window and dragged to situate and size the mask as desired. The mask has been resized larger and a repositioned as shown in the right illustration.

While the invention has been described with respect to particular embodiments above, it would be understood by those skilled in the art that modifications may be made without departing from the spirit and scope of the invention. For example, while the masked area will not receive the selected image effect, it may receive a complementary or opposite image effect. If the overall luminance level of the display is to remain constant and an artist increases the brightness of the unmasked area, the brightness of the masked area may be decreased. These embodiments are for purposes of example and illustration only and are not to be taken to limit the scope of this invention narrower than the appended claims.

I claim:

1. A computer program product on a computer memory executable by a computer for altering an image according to an image effect which is limited by a mask comprising:

means for mapping the mask to assign mask pixels to a reduced set of regions to create a mapped mask, the mask pixels correspond to collocated image pixels from the image, a first and a second color palette being respectively assigned to an unmasked and masked region;

means for applying the image effect to the first palette to produce an altered first palette; and means for displaying the image wherein colors for image pixels corresponding to the masked and unmasked regions of the mapped mask are chosen from the second and altered first palettes respectively.

2. The product as recited in claim 1 further comprising:

the reduced set of regions also including a transition region located between the unmasked and masked regions, a third color palette being assigned to the transition region;

means for partially applying the image effect to the third palette to produce a partially altered third palette; and means for displaying the image wherein colors for image pixels assigned to the transition region of the mapped mask are chosen from the partially altered third palette.

3. The product as recited in claim 2 which further comprises:

means for matching mask pixels in the transition region to a respective intensity value within a continuous grey scale; and means for developing the image by applying the image effect to an original set of colors for image pixels in the image which correspond to the unmasked and transition regions and multiplying the respective intensity value to correspond image pixels.

4. The product as recited in claim 1 further comprising means for selecting colors for the first and second palettes according to colors for the first and second palettes according to colors in the image at the image pixels which correspond to the unmasked and masked regions of the mapped mask.

5. The product as recited in claim 1 further comprising means for defining a first set of regions of the mask including an unmasked region, a masked region and a plurality of transition regions between the unmasked and masked regions to make continuous grey scale.

6. The product as recited in claim 5 further comprising means for selecting colors for the first and second palettes according to colors in the image at image pixels corresponding to the initial assignment of mask pixels to the unmasked and masked regions.

7. The product as recited in claim 1 wherein the mask mapping means maps the mask to the reduced set of regions by dithering.

8. The product as recited in claim 1 wherein the mask mapping means maps the mask to the reduced set of regions by error diffusion.

9. A computer readable memory for storing data and instructions executable by a computer for altering an image according to an image effect which is limited by a mask comprising:

a first and a second color palette;

means for respectively assigning the first and second palette to an unmasked and a masked region of the image;

a first and a second set of image pixels;

means for respectively assigning the first and second set of image pixels to the unmasked and masked regions of the image;

means for assigning mask pixels to a set of regions in the mask including the unmasked and masked regions, the mask pixels corresponding to colocated image pixels;

means for mapping the mask to assign mask pixels to a reduced set of regions to create a mapped mask;

means for applying the image effect to the first palette to produce an altered first palette; and means for displaying the image using colors for image pixels corresponding to the masked and unmasked regions of the mapped mask chosen from the second and altered first palettes respectively.

10. The memory as recited in claim 9 wherein the reduced set of regions also includes a transition region located between the unmasked and masked regions, and further comprises:

a third color palette;

means for assigning the third color palette to the transition regions; and a third set of image pixels;

means for assigning the third set of image pixels to the transition region;

means for partially applying the image effect to the third palette to produce a partially altered third palette; and wherein the image is displayed using colors for image pixels assigned to the transition region of the mapped mask chosen from the partially altered third palette.

* * * * *